INVENTORS.
CHARLES PAQUOT AND
ROGER PERRON AND
ANDRÉ MATHIEU,

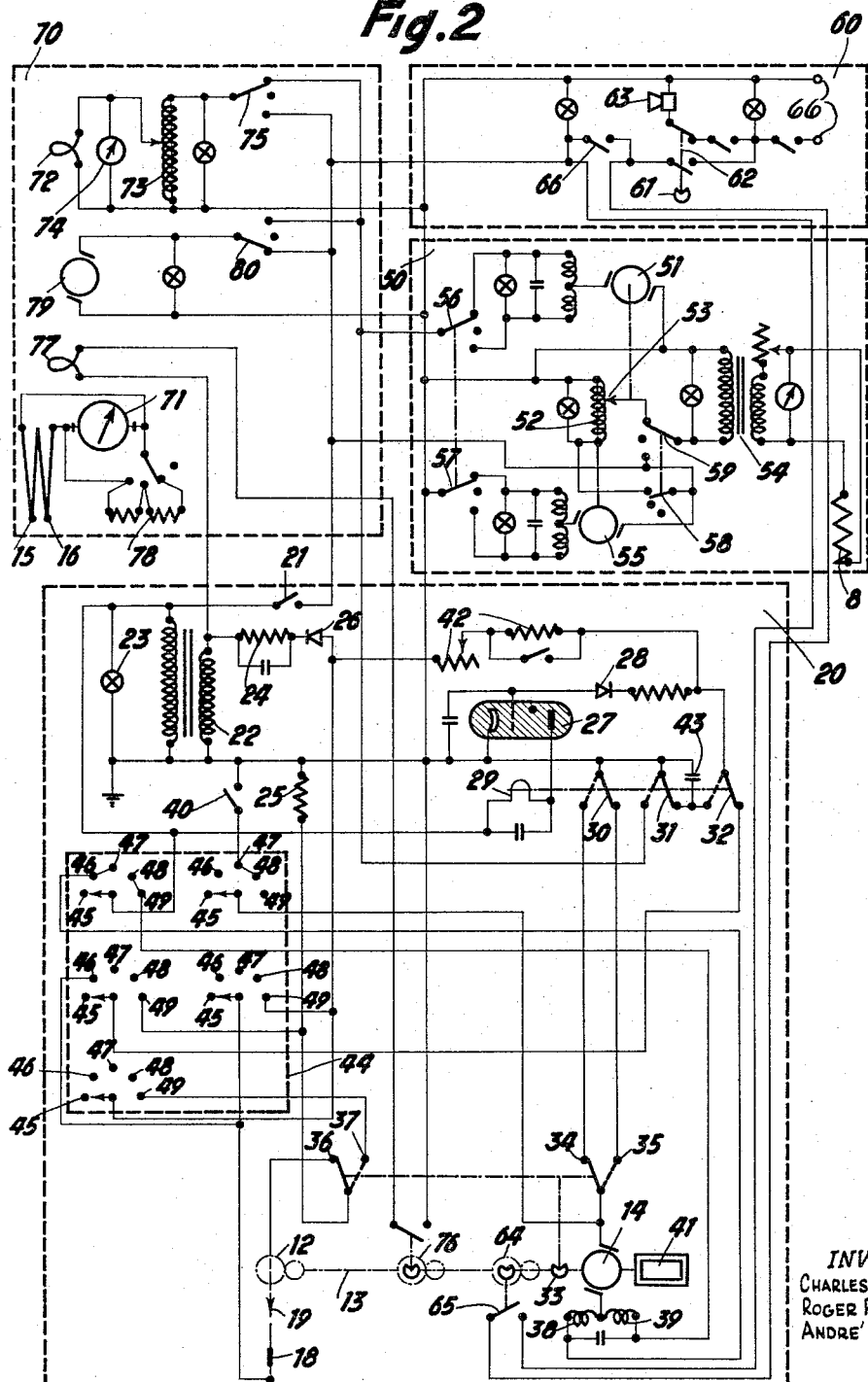

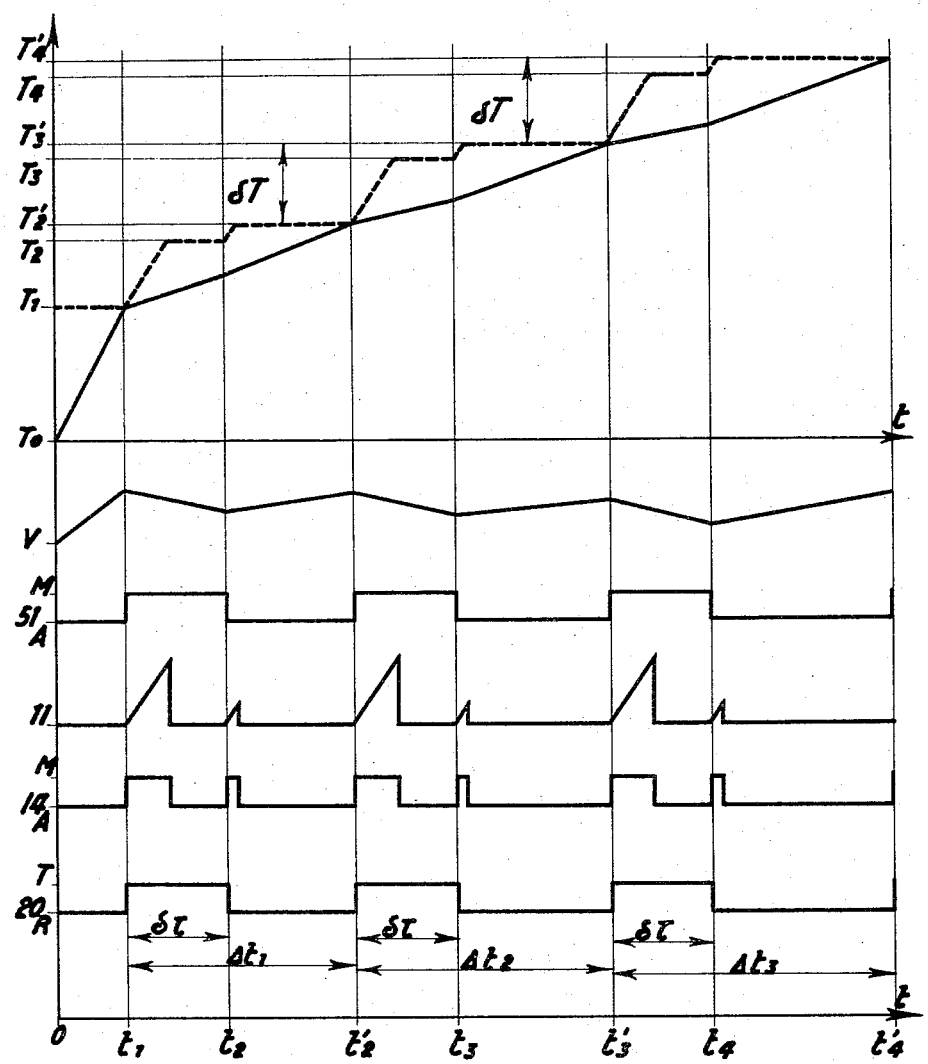

United States Patent Office 3,314,279
Patented Apr. 18, 1967

3,314,279
APPARATUS FOR RECORDING AND REGULATING TEMPERATURE DURING DIFFERENTIAL THERMAL ANALYSIS
Charles Paquot, Paris, Roger Perron, Chatenay-Malabry, and André Mathieu, Bagneux, France, assignors to Etablissement Public: Centre National de la Recherche Scientifique, Paris, France, a corporation of France
Filed July 8, 1964, Ser. No. 381,044
Claims priority, application France, July 10, 1963, 941,022
13 Claims. (Cl. 73—15)

The present invention concerns a process to record and regulate temperatures in differential thermal analysis, and an apparatus for carrying out the said process.

It is known that differential thermal analysis consists essentially of measuring the difference in temperatures $\Delta T$ between a sample being tested and a reference element free from thermal manifestations in the temperature range in which the experiment is being carried out, as a function of the temperature T of said reference element, which increases or decreases at a rate which is theoretically constant. The measurements of $\Delta T$ are often very slight and are usually measured by thermocouples, with potentials in opposition, connected to a sensitive galvanometer, one of these thermocouples being immersed in the reference element and the other in the sample being examined. The curve resulting from these measurements is a curve $\Delta T$ as a function of T. However, the thermal analysis apparatus in normal use is more suitable for mineral compounds where the temperature T is high, and may normally reach 1,000 to 1,500° C., with great differences in temperature $\Delta T$. Such measurements are not very precise, as in practice a temperature is determined to within 2 or 3° C.

An object of the present invention is a process which gives the values of $\Delta T$ both as a function of the temperature T and of time $t$. This process is especially suitable for use with organic compounds where T is low and $\Delta T$ is slight.

Another object of the invention is an apparatus for carrying out this process, which is remarkably sensitive and precise, but is not costly, and which allows automatic recording of the curves $\Delta T$ (T).

Another object of the present invention is to use a regulating device in connection with the recording system of the above mentioned curves in order that experiments may be carried out according to a constant heating (or cooling) rate at a level which may be selected within wide limits.

The process used in the invention to control variations in temperature is of the derived correction type, and is associated with the recording of this temperature.

An object of the invention is a process to determine and regulate temperatures in differential thermal analysis in which the differences in temperature $\Delta T$ are measured betweeen a sample to be studied and a reference sample, as a function of the temperature T of the reference sample, with thermocouples having potentials in opposition and with two end welds. The first of these welds contacts the sample to be studied and the second contacts the reference sample, the sample to be studied being contained in a first hole in a block and the reference sample being contained in a second hole in said block. The block in question transmits the calories, supplied by a source of electric heating, to the above mentioned samples, whereby the process by means of a first elementary variation in temperature of with the block $\delta T$, the said variation $\delta T$ being fixed and predetermined, a variation $\Delta V$ of the potential of the said source during an elementary time $\Delta t$ is controlled to produce a corresponding consecutive variation $\delta T$ of the temperature of the said block. A derived correction of the said variation of potential $\Delta V$ is carried out by opposing to this variation $\Delta V$, during a fixed and predetermined time $\delta t$, a fixed elementary potential $\delta V$ to supply substantially the said source of calories by a potential subjected to variations which are practically linear and continuous in relation to the time, and to vary the temperature of the block in relation to time according to a practically linear law.

According to the invention, the longer the elementary time $\Delta t$ needed to increase (or lower) the temperature $\delta T$ of the thermal block, the greater is the variation of the potential $\Delta V$, and this acts in a second elementary time in an opposite direction to the first variation.

The succession of these operations tends to introduce a linear law of variation of the temperature of the block in relation to the time, that is to say, a constant rate of variation, the value of which is determined by the characteristics of the regulating device.

The variation in potential between the beginning and end of the operation is represented by the algebraic sum of the partial variations in potential. It is a translation of the variations of the thermal exchanges of the whole of the regulated system.

Such a regulator can obviously only function if the supply of calories, whether positive or negative, received by the block is always greater than that necessary to maintain regulated law at all times. In all cases the process consists of heating the block, for the process of differential thermal analysis in raising temperatures as well as in decreasing temperatures.

An apparatus to carry out the above mentioned process comprises a metallic block with several holes in it, one of the holes containing a sample to be studied, a second of the holes containing a reference sample; at least one source of power; more than one thermocouple having welds at both ends, connected in opposition of potential in a circuit comprising means for recording the intensity, the first of said welds being in operational contact with the sample to be studied and the second weld being in operational contact with the reference sample; an elongated liquid thermometer with a contact wire, having a first extremity and a second extremity, said second extremity acting as a reservoir for liquid and being immersed in a third of said holes, said contact wire being joined to mechanical means which may be moved along the longitudinal axis of the thermometer; first electromechanical means connected with said mechanical means to carry out a predetermined displacement of said contact wire, said first electromechanical means being brought into action by the contact of the wire with the thermometer liquid, the displacement of the wire between two successive positions being fixed and defined beforehand, said first electromechanical means being in operating connection with said means for recording for each contact of the wire with the thermometer liquid; means for heating said metallic block; second electromechanical means to operate said means for heating according to a heating rate which is practically linear, said second electromechanical means being in operating connection with said first electromechanical means during a time which is a function of the time said first means are in action; and movable means of switching each working in conjunction with a circuit adapted to the movement to be carried out.

In practice the variable contact thermometer defines the interval $\delta T$, while a rotary autotransformer enables a linear law to be imposed in relatioin to the time of the variation of potential applied to the heating resistance of the block and also acts as a correction of potential.

The means for recording intensity comprises a galvanometer, each of the terminals of which is connected to an end weld of electric thermocouples, a closed dark room containing this galvanometer and a spot light placed inside the dark room which is switched on through the first electromechanical means, when the wire comes into contact with the thermometer liquid.

The first electromechanical means can consist of: a first synchronous motor with two directions of rotation, the shaft of which is coupled at one of its ends to the mechanical means which carry the contact wire, this coupling converts the rotary movement of the shaft to a movement in translation of the wire; a relay, which operates the contacts when the wire is in contact with the thermometer liquid and is connected to the said means of recording; means of time-lag put into operation simultaneously with this relay control the contacts to bring them back to their normal position, these means of time-lag being connected to the second electromechanical means which control the heating of the block, the shaft of the motor being driven in rotation to the stopping position fixed by a cam mounted on its shaft, then being again driven in rotation after the means of time-lag come into operation, the cam again stopping the rotation of the shaft in such a way that the motor shaft turns about 360° during an elementary measurement corresponding to the gap $\delta T$, of the temperature marked by the contact wire. The shaft of the first synchronous motor may have an apparatus to count the revolutions and a cam working in conjunction with the means of recording and a third cam working in conjunction with the contacts connected to the feed source and which allows the circuit to be broken. The control contacts are conveniently connected to a relay connected to the plate of a triode valve while the grid of the valve is connected to the means of time-lag.

The means of time-lag consist with advantage of a condenser and a resistance of adjustable value, the condenser being linked to the grid of the triode valve, and connected to the second electro-mechanical means which controls the heating of the block.

The second electromechanical means for controlling the heating of the block consists conveniently of an autotransformer with a rotating cylindrical cage and a runner, mobile in rotation and working in contact with the inside of said cage, the cage and the runner being driven in rotation in the same direction by two separate synchronous motors with two directions of rotation, the speed of the runner being higher than that of the cage, the runner being connected to the heating resistance of the block and the synchronous motor for driving the runner being connected to the time-lag means, that is the condenser and the variable resistance, of the first electromechanical means.

Such an apparatus may also include supplementary device, known to specialists, and amongst others:

a general switchboard
a general feed supply system with safety devices
a device enabling the circuit to be broken for extreme thermometer temperatures, or for any other intermediat temperatures
a device enabling temperatures to be marked on the thermograms
a classical system to feed a spot light which allows the intensity of the light to be regulated.

All these supplementary devices are correctly associated with the essential elements of the differential heat analysis apparatus described above.

It is important to note that the essential characteristic of the invention lies in the fact that it is the variable contact thermometer which starts the whole of the electromechanical devices of the recording apparatus according to the invention, and this in such away that said thermometer is made to take a new measuring position, while at the same time causing the temperatures to be recorded automatically and the heating or cooling program of the sample to be controlled automatically.

It is interesting to note that the differential thermal analysis of a sample according to various values of heating or cooling rates is of great importance because certain rates allow structures or compositions to be brought to light which are not revealed with other rates.

The process which is the object of the invention possesses this adventage both for heating or cooling a sample as well as other advantages which will be apparent from the following description.

It should be noted that the process of the invention allows the function $\Delta T$ (T) to be determined either during the heating period or during the cooling period. These two processes of heating and cooling may be consecutive, which in certain cases offers unquestionable advantages.

A detailed description follows of apparatus constructed according to the invention, reference being made to the attached drawings in which:

FIG. 2 shows the mechanical and electrical connections associated with the thermal block and forming the various parts of the apparatus according to the invention;

FIG. 4 is a working diagram showing separately the operation of certain parts of the apparatus during differential thermal analysis according to rising temperatures and also the corresponding variations as a function of time of the temperature of the thermal block and that marked by the contact wire of the thermometer.

Figure 1:
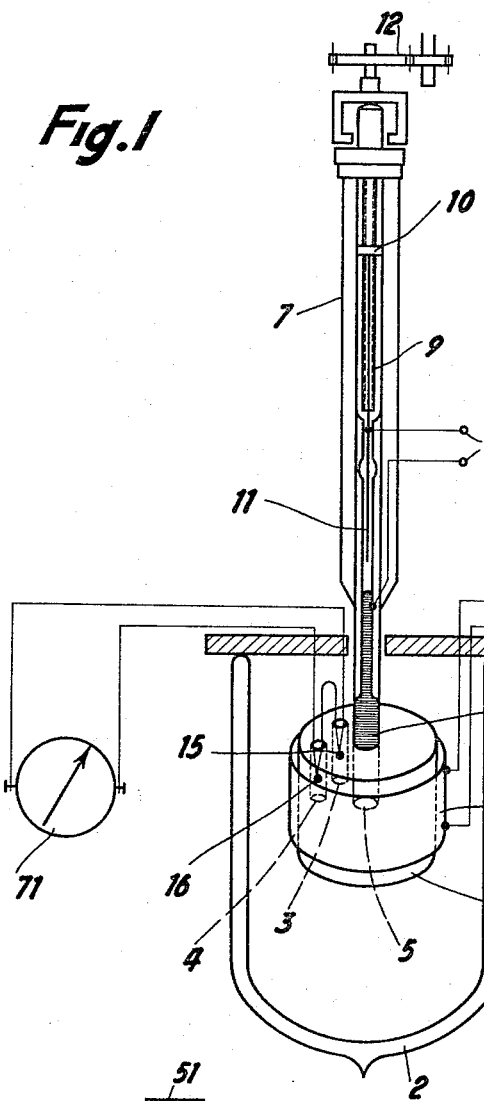
FIG. 1 is a diagrammatic view, partly in cross section, and partly in perspective, of the contact thermometer itself and the thermal block.

In FIGURE 1, the reference 1 shows a metallic block suitably supported by an appropriate support (not shown) which is enclosed in a Dewar vase 2, which can contain a cooling liquid if necessary. Provided in block 1 are a hole 3 for the reference element, a hole 4 for the sample and a third hole 5 to contain the bulb 6 of a contact thermometer 7. The metallic block 1 is surrounded by a heating collar 8, which may be a heating element connected to the terminals of a heating and regulating apparatus represented by the assembly 50 (FIGURE 2) and which is described more completely hereafter.

The control thermometer 7 consists essentially of an endless screw on which moves a nut 10 bearing a contact wire 11 which comes into contact with the mercury in the bulb 6 of the thermometer. The endless screw 9 is connected by a joining assembly, arranged in any suitable manner, and consisting of, in particular, pinions 12 at the shaft 13 (FIGURE 2) of a synchronous motor 14 having two directions of rotation. Two thermocouples 15 and 16 in opposition of potential are placed respectively in hole 3 containing the reference element and hole 4 containing the sample to be examined. They are connected to the terminals of a sensitive galvanometer 71, placed in a dark room, which is shown diagrammatically in 70. The terminals 17 of thermometer 7 are connected to the contacts 18 and 19 of an electromechanical device 20 which will be described in detail hereafter.

Turning to FIGURE 2 on which is shown in 20 the assembly of the electromechanical device. This assembly is connected to terminals 66 of the main supply by a classical feeding device consisting of a main switch 21, a transformer 22, a pilot lamp 23, two resistors 24 and 25, and a rectifier 26. The means provided for driving the thermometer screw 9 and the control of the spot light 72 placed in the dark room 70 is connected to connections 18 and 19 of the thermometer. It consists essentially of a gas filled triode valve 27 with a rectifier 28 on the grid circuit, a relay 29 and a system of contactors 30, 31, and 32, set in action by the relay 29; a cam 33 controlling the positions of contacts 34, 35, 36 and 37, is mounted on the shaft 13 of the synchronous motor 14 which causes the thermometer wire 11 to rise or fall. The direction of rotation of this motor 14 is determined by the current passing in one or other of the Frager turns 38 and 39 of this motor. A manual contactor 40 allows the motor 14 to be moved for the continuous rising or lowering of wire 11.

On the shaft 13 of motor 14 a mechanical revolution counter 41 is also fixed to allow exactly the temperatures recorded after calibration to be registered. The group of resistors 42 and a condenser 43 allows the operating time of a motor 51 forming part of the regulation assembly 50, to be adjusted, this will be described in greater detail hereafter, and also insures the switching on and off of the spot light 72 placed in the dark room 70.

This assembly also insures the starting of motor 14, as is described later. 44 represents a control system consisting of a quintuple manual contactor with five positions corresponding respectively to the following operations:

in position 45: starting the electronic system and keeping it in operation
in position 46: measurement of rising temperatures
in position 47: continuous rising of the temperature wire
in position 48: continuous lowering of the temperature wire
in position 49: measurement of decreasing temperatures.

The operations are carried out in the following manner, according to the position of switch 44.

In position 46 the grid of the triode valve 27 has a certain voltage in relation to the cathode, this voltage being sufficient so that current cannot pass to start the relay 29 which controls the contactors 30, 31 and 32.

When the mercury is in contact with the wire 11 of thermometer 7, the grid is short-circuited in relation to the cathode and a current then acts upon the relay 29.

The contactor 30 sets the motor 14 in movement until the cam 33 tilts the contact 34 to 35 and the contact 36 to 37, which has the effect of stopping the motor 14 at is waiting position and also breaks the circuit of thermometer 7. Breaking the circuit of the thermometer ensures that no anomalies occur in its functioning if the mercury should again come into contact with the wire 11 before the cycle of operations has brought the electronic system back to the initial conditions.

The contact 31 which tilts at the same time as the contactor 30, establishes a current in the feed circuit of the spot light 72 which lights up and starts the motor 51 of the regulating assembly 50. Finally, the contactor 32, which also tilts at the same time as the contactor 30, puts the condenser 43 under charge through the resistance 42. Once charged, the condenser 43 restores the voltage in the grid of valve 27 and this stops the action on the relays 29. The contactors 30, 31 and 32 then return to their initial positions with the result that the motor 14 (contactor 30) starts again, until the cam 33 returns the contact 35 to the position 34, which is the starting position of the motor for a new measurement, after a revolution of exactly one turn, recorded by the mechanical revolution-counter 41. At the same time the contact 37 returns to the position 36, thus restoring the thermometer circuit.

The movement of contactor 31 also causes the discharge of the condenser 43 and the return of the contactor 32 to its original position and restores the circuit between the grid valve 27 and the thermometer 7. Everything is now ready for a new measurement.

When the switch 44 is in position 49 and the contact is established between the mercury and the wire 11, the grid of the valve 27 is under voltage so the relay 29 cannot be affected. When the wire 11 is no longer in contact with the mercury, the voltage of the grid is abolished and the various operations succeed one another as before.

Contrary to what occurs in the preceeding case, the position of contact 37 restores the thermometer circuit while the motor 41 switches over from the off-position to the new starting position.

When the switch 44 is in position 47 or 48, the electronic system is isolated and the motor 14 can run continuously, the circuit being switched on or off by the contactor 40 as required, this allows the initial contact position between the wire 11 and the mercury to be established at will at the beginning of an experiment.

Figure 3:
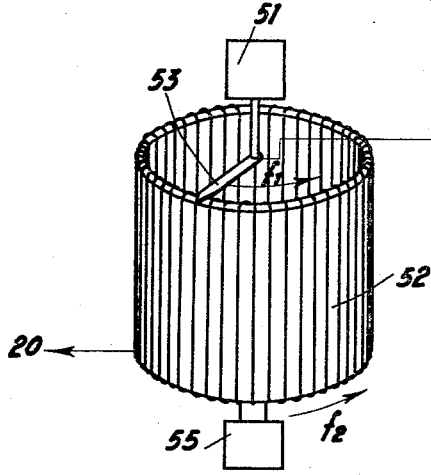
FIG. 3 is a diagrammatic and perspective view of the revolving cage autotransformer and mobile runner used for regulation.

Herewith follows a more detailed description of the regulating device 50, which operates in connection with the feed device of the resistor 8 of the heating collar and allows the heating of said collar to be conditioned. This device 50 consists essentially of a variable autotransformer 52 having the general form of a cylindrical cage with touching turns and including a shoe or runner 53 as can be seen in FIGURE 3. The runner 53 is connected to the heating collar 8 through a stationary transformer 54 which feeds said collar. The autotransformer 52 is also connected both with a synchronous motor 55 with two directions of rotation, connected to the main supply, with the object of turning the cage of the autotransformer in either direction, and also a synchronous motor 51 with two directions of rotation which allows the runner 53 of the autotransformer to rotate. The shoe or runner 53 and the cylindrical cage of the autotransformer turn in the same direction (arrows $f_1$ and $f_2$ in FIGURE 3); the angular speed of rotation of the runner is greater than that of the cage, to insure the potential correction allowed for in the invention. Coupled reversers at zero point 56 and 57 allow the direction of rotation of the two motors 51 and 55 to be reversed and stopped. The reference 58 and 59 show a coupled contactor and reverser which allows quick heating to be carried out without regulating or stopping the heating. Two coupling limiters (not shown) may be attached to prevent the consequences of an accidental thrust.

It can be seen from the assembly shown in the drawing (FIGURE 2) that the motor 51 is connected to the electromechanical means 20, in such a way as to receive a current during the time determined by the time-lag means 42 and 43. The rotating autotransformer 52 allows a zero electromotive force to be obtained and, owing to its large number of turns, it is possible to obtain a very low rate of oscillating regulation.

Finally, the heating (or cooling) rates which can be obtained depend essentially on the relation of the speeds of the two motors 51 and 55 and the elementary temperature gaps between two consecutive positions of the thermometric wire 11.

It can be theoretically shown that the heating rate achieved by the apparatus of the invention is solely a function of the relation of the angular speeds of the runner and of the cage of the autotransformer 52 and the relation of the elementary variation of temperature $\delta T$, fixed, selected on the contact thermometer, to the time $\delta t$, fixed, selected for the correction of potential. It is therefore possible to alter the heating rate within broad limits by changing the values of these relations.

Herewith follows a description of the main auxiliary devices which are provided for in the apparatus of the invention. 60 shows the general feed system and safety system which is connected to the main supply. The assembly 60 consists of an adjustable clock mechanism 61 operating on a double contactor 62 which can break the feed current after a previously determined period of time. A warning hooter 63 may be installed. Through an assembly of reduction gears placed on its shaft the motor 14 of the thermometer 7 can operate a contact cam 64 which acts on the contactor 65 of the general feed circuit. After having adjusted the position of the contactor 65 in relation to the cam 64, it is possible to break the circuit for the extreme temperatures on the thermometer, or for any intermediate temperature. A contactor 66 allows the current to be subsequently reestablished.

In the dark room shown diagrammatically at 70 there is a classic device to feed the spot light 72 which lights the mirror of the galvanometer 71. This device consists more particularly of an autotransformer 73 controlled by a voltmeter 74 which allows the light intensity to be selected to obtain correct exposure of the photographic paper, and or a zero point reverser 75.

The marking of temperatures on the thermometer is made possible by the indications of the mechanical revolution-counter 41. This marking may be made more easy due to a graphic marking device which consists of a mechanical gearing down device 76 and a bulb 77 which by means of a suitable optical device emits a ray of light which throws an image on the thermogram at every fifth or tenth temperature reading registered.

Finally, as well as the spot light 72 and various optical fittings not shown, the dark room also contains the galvanometer 71 and its shunts 78 as well as a device for unwinding the photographic paper at several speeds, which is shown at 79 with a reverser 80, this device may be fed either continuously or only while the motor is running.

FIGURE 4 shows a diagram corresponding to a process of differential thermal analysis, with rising temperatures, the times being marked on the abscissa and temperatures on the ordinate, of the way certain parts of the device operate on the lower diagram and the temperatures are shown on the upper diagram.

Starting from the bottom of the diagram and shown successively as a function of time are:

the operation of the first electromechanical means, 20, that is to say the relay 29 controlled by the time-lag means 42, 43,
the operation of the thermometer motor 14
the operation of the thermometer wire 11
the operation of the runner motor 51
the difference of potential V applied to the heating collar 8
by dotted lines, the temperature indicated by the contact wire
by continuous line, the temperature of the thermal block.

According to the invention an elementary variation $\delta T$ of the temperature of the block causes an elementary variation of potential to which the heating collar 8 is subject, this potential being obtained by difference of the potential $\Delta V$ corresponding to the elementary variable time of action $\Delta t$ and of a fixed correction potential $\delta V$, corresponding to a fixed time of elementary action $\delta t$.

For example, when the temperature of the block has passed from value $T_1$ to the value $T'_2$ during an elementary time $\Delta t_1$ equal to $\Delta t_1 = t'_2 - t_1$, under the effect of a variable elementary potential, this latter undergoes a consecutive derived correction for a fixed time $\delta t$ equal to $\delta t = t_3 - t'_2$ to cause the temperature of the block to pass consecutively from $T'_2$ to $T_3$. The successive elementary variations of temperature, for example $T'_2 - T_1$ and $T'_3 - T'_2$ are equal to the fixed and predetermined value $\delta T$.

In this way a series of successive corrections is carried out, thanks to which the character of the temperature curves as a function of the time is practically linear, as can be seen from the upper part of the diagram of FIGURE 4.

As an example, there follows the characteristics and numeric values of the main elements of an apparatus according to the invention and with which good results have been obtained in experiments of thermal analysis in organic chemistry.

Contact thermometer 7: 1.55 turns of the endless screw by degree cut-in power 0.5 watt
Series resistance on circuit: 500,000 ohms
Temperature scale: $-35°$ C. to $+100°$ C.
Resistance of the heating collar 8: 4.1 ohms
    4.1 ohms
Pinions 12:
    Driving 35 teeth
    Driven 79 teeth
Galvanometer 71:
    Internal resistance: 22 ohms
    Damping period: 1.8 sec.
    Sensitivity: $7.5 \times 10^{-9}$ a./mm./min.
    Critical exterior resistance: 20 ohms
    Shunts: 0 to 10 ohms
Entrance transformer of the electronic system: 110/6 volts, 20 v.a.
Gas filled triode valve 27: type PL-21
Synchronous motor 14: 30 revolutions/min., coupling 600 g./cm. reduction to 13.3 revolutions/min.
Resistance assembly 42: variation of 0 to 1 megohm and from 1 to 2 megohms
Condenser 43: 30 $\mu F$
Synchronous motor feeding photographic paper:
    10 revolutions/hour
    Coupling 300 g./cm. speed alterable by changing the pinions to 3.33
    6.66 and 13.33 revolutions/hour
Autotransformer 52: 220 volts, 138 v.a.—fed by 110 volts
Transformer 54: 110/12 volts—60 v.a.
Synchronous motor 55: 4 revolutions/hour—coupling 3 kg./cm.
Synchronous motor 51: 7.5 revolutions/hour—coupling 3 kg./cm.

Before starting the apparatus, classical measures are taken to calibrate the temperature differences of the electromotive force of the thermocouples 15 and 16 in opposition of potential. Also the divisions of the revolution-counter 41 are selected once and for all according to the range of the thermometer scale, the coupling 16 immersed in the sample is calibrated in relation to a precision thermometer and a temperature calibration curve is established as a function of indications given by the revolution-counter 41. The temperatures so noted are the true temperatures of the sample examined. The curve obtained, even with a normal contact thermometer, is always straight with iron-constantan thermocouples.

It should be noted that, if necessary, it is possible to alter the temperature gaps T between two measurements by replacing the pinions 12 by other suitable pinions.

The application of the numerical indications previously given enables the temperature T to be easily noted every $0.15°$ C. According to these numerical values it is possible, by using a regulator to alter the heating (or cooling) rate between $0.2°$ C. and $4°$ C. per minute.

It can be seen that all these conditions can easily be changed both mechanically and electrically. It is also possible to obtain independant curves $\Delta T$ (T) and $\Delta T$ (t), by operating the reversers 75 and 80. In both these cases the operation of the graphic temperature recording device enables the curve $\Delta T$ (t) to be obtained.

In order to demonstrate the advantages of the apparatus according to the invention, some examples of use will now be given, first to determine the melting point in differential thermal analysis and secondly an investigation into cocoa butters, the differentiation of these fats being considered as difficult.

*Example 1—Determination of melting temperature in differential thermal analysis*

This investigation was carried out on various high saturated fatty acids, that is to say, dodecanoic, tetradecanoic, hexadecanoic and octadecanoic acids under the following conditions:

The melting points of these compounds being between

40° and 70°, the melting curves were recorded, starting, in each case, from a temperature 15° lower than the melting point of the studied compound, the experiment being continued to 10° above this melting temperature. 0.3 g. of diethyl phthalate were used as a reference element.

In all the experiments the regulating device was adjusted in such a way as to maintain the heating rate at 0.6° per minute for all the experiments.

A series of experiments was then carried out varying the mass of the sample. The results obtained allowed the temperature of alterations in state to be determined exactly on the thermograms.

The present invention possesses important advantages in the fact that it is possible to carry out a rapid succession of melting and recrystallization operations of a chemical system, to obtain a perfectly reproducible thermal cycle. The recordings obtained, which are always reproducible allow the differential examination of melting-recrystallization phenomena under the best possible conditions.

It has already been pointed out that the process of differential thermal analysis according to the invention is perfectly regulated both for increasing and decreasing temperatures, and that it is possible to measure temperatures with a precision of at least 0.1° C.; by selecting $\delta T = 0.2°$ C. for example.

*Example II—Investigation into cocoa butter*

Three series of examinations were carried out on three types of cocoa butter, one extracted under pressure, the second extracted hot by hexane, the third being a cake-butter also extracted by hexane. The differentiation of these butters, especially between the first two has up to now been especially difficult and uncertain.

This differentiation is now much easier as this invention enables the work to be carried out selecting various constant heating or cooling rates.

Crystallization thermograms have been effected for this purpose. 0.3 g. (examples) were used, these were heated systematically at 50° C. and were then cooled to −5° C. at a constant rate of 1.2° per minute. The recrystallization curve $\Delta T$ (T) was then recorded.

A sufficient quantity of liquid nitrogen was placed in the Dewar vase and the gaseous nitrogen was splashed at the rate of 100 litres per hour, to ensure the system being cooled during the entire experiment.

Results obtained showed that the essential differences between the thermograms lie in the appearance of a small point which notches the large crystallization point. This point hardly exists in pressure extracted butter whereas it is very obvious in butter extracted by hexane, the cake-butter has a less accentuated point than the latter.

It is important to note that these differential characteristics were only obtained from the cooling rate given. At lower rates it was not possible to distinguish clearly between the three butters examined.

This result is a direct consequence of one of the essential characteristics of the invention, that is to say, the regulation of the cooling rate for various values of this rate, which thus allows the thermal behaviour of samples to be examined as a function of these values.

It should be noted that the process of differential thermal analysis according to the invention may be applied to numerous chemical or physicochemical reactions, especially in organic chemistry, to study polymerization for example.

What we claim is:

1. An apparatus to record and regulate temperatures during differential thermal analysis comprising, a metallic block with at least three holes therein, the first of said holes for receiving a sample to be examined, the second of said holes for receiving a reference sample; at least one source of power; a differential thermocouple connected in an electrical circuit, said circuit including means for recording electro-motive force, said differential thermocouple having its first junction in said first hole and its second junction in said second hole; an elongated liquid thermometer having a contact wire, one end of said thermometer acting as a reservoir for liquid and positioned in the third of said holes, said wire being joined to a mechanical means for movement of said wire along the longitudinal axis of said thermometer; a first electromechanical means connected with said mechanical means to carry out a predetermined displacement of said wire, said first electromechanical means being actuated by contact between said wire and said thermometer liquid, the displacement of said wire between two successive positions being fixed and predetermined, said first electromechanical means being in operating connection with said recording means during contact between said wire and said thermometer liquid; means for heating said metallic block; a second electromechanical means to actuate said heating means, said second electromechanical means being in operating connection with said first electromechanical means; and movable means for switching in said circuit.

2. The apparatus of claim 1 in which said first electromechanical means consists of: a first synchronous motor with two opposite directions of rotation, having a shaft with two ends; a mechanical coupling mounted between the first end of said shaft and the mechanical means associated with said wire, said mechanical coupling being adapted to convert the rotational movement of said shaft to a movement of said wire; a first and a second group of contacts, each group having two positions; a first cam mounted on said shaft with the first group of contacts; control means for moving said second group of contacts from a first position to a second position when said wire is in contact with the thermometer liquid, said second position of said second group of contacts setting up the operating connection with said recording means; time-lag means starting at the same time as said control means and being in operating connection with said control means to move said second group of contacts back to its first position from its second position, said time-lag means also being connected to said second electromechanical means, said shaft of said first motor rotating from its first position when the second group of contacts reaches its second position, said first cam moving said first group of contacts from its first to its second position and thereby stopping said shaft at its second position, said shaft rotating again from its second position when said second group of contacts has returned to its first position through the action of said time-lag means, said first cam moving said first group of contacts from its second to its first position and thereby stopping the rotation of said shaft in a position practically coinciding with its first position, the shaft having turned 360° before the following measurement.

3. The apparatus as claimed in claim 2 in which said means of control comprise: a triode valve; a relay connected to a plate in said triode and in operating connection with said second group of contacts, a grid of said valve being connected to said time-lag means.

4. The apparatus of claim 2 in which said time-lag means consists of a condenser and a resistance of an adjustable value, said condenser being connected with said control means and with said second electromechanical means.

5. The apparatus of claim 3 in which the time-lag means consists of a condenser and a resistance of an adjustable value, said condenser being connected to the grid of said triode.

6. The apparatus of claim 2 in which said shaft of the first synchronous motor has at its second end means to count revolutions, a second cam mounted on said shaft and operating in conjunction with the recording means.

7. The apparatus of claim 2 in which said shaft comprises a third cam operating a contact means, connected to the said source of supply and capable of breaking circuit.

8. The apparatus of claim 1 in which the second electromechanical means consists of an autotransformer having a winding, consisting of a closed cylindrical cage with a pivot axis, a runner in mobile rotation around the said axis and in operating contact with said cage; a second synchronous motor with two directions of opposing rotation mounted on the pivot axis of said cage to turn said cage at a constant speed, a third synchronous motor to turn the runner in the same direction as said cage whereby the speed of said runner is greater than that of said cage, the runner connected to said heating means and said third synchronous motor in operating connection with the first electromechanical means.

9. The apparatus according to claim 8 in which said third synchronous motor to turn the runner is connected to the time-lag means of said electromechanical means.

10. The apparatus of claim 8 in which the second electromechanical means has in addition a transformer with two poles, one pole being connected to said runner while the second pole is connected to the heating means.

11. The apparatus as claimed in claim 1 including a galvanometer having two terminals connected to said differential thermocouple and received in an enclosure free of external light.

12. The apparatus as claimed in claim 1 wherein said thermometer is a closed elongated bulb containing mercury in said one end, and further contains an endless screw which extends the full length inside said bulb, a nut working in conjunction with the said screw, a wire fixed to the said nut to make contact with the mercury, a first conductor connected to the said wire and a second connector in contact with the mercury, said conductors being connected to the said first electromechanical means.

13. The apparatus as claimed in claim 1 including a manual switch.

References Cited by the Examiner

Campbell, C., et al.: "Drivative Thermoanalytical Techniques." In Analytical Chemistry. 31(7): pp. 1188–1191. July 1959. QD 71 142 in Group 170.

Freeman, E. S., et al.: "Simple Method for Derivative Differential Thermal Analysis." In Analytical Chemistry. 31(4): pp. 624–625. April 1959. QD 71 142 in Group 170.

Gordon, S., et al.: "DTA of Inorganic Compounds." In Analytical Chemistry. 27(7): pp. 1102–1103, 1106. July 1955. QD 71 142 in Group 170. Copy in 73–15 DTA.

Muller, R. H.: "DTA." In Analytical Chemistry. 35(4): pp. 103A–104A. April 1963, QD 71 142 in Group 170. Copy in 73–15 DTA.

Vassallo, D. A., et al.: "Precise Phase Transition Measurements of Organic Materials by DTA." In Analytical Chemistry. 34(1): pp. 132–135. January 1962. QD 71 142 in Group 170. Copy in 73–15 DTA.

RICHARD C. QUEISSER, *Primary Examiner.*

J. C. GOLDSTEIN, *Assistant Examiner.*